US012406670B2

(12) United States Patent
Rodriguez Bravo et al.

(10) Patent No.: US 12,406,670 B2
(45) Date of Patent: *Sep. 2, 2025

(54) AUGMENTED REALITY ENABLED COMMAND MANAGEMENT

(71) Applicant: Kyndryl, Inc., New York, NY (US)

(72) Inventors: Cesar Augusto Rodriguez Bravo, Alajuela (CR); David Alonso Campos Batista, Aurora (CR); Sarbajit K. Rakshit, Kolkata (IN)

(73) Assignee: Kyndryl, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,799

(22) Filed: Apr. 17, 2024

(65) Prior Publication Data
US 2024/0265920 A1 Aug. 8, 2024

Related U.S. Application Data

(63) Continuation of application No. 16/991,363, filed on Aug. 12, 2020, now Pat. No. 11,996,095.

(51) Int. Cl.
G10L 15/00 (2013.01)
G06F 3/01 (2006.01)
(Continued)

(52) U.S. Cl.
CPC .............. *G10L 15/22* (2013.01); *G06F 3/017* (2013.01); *G06F 18/2155* (2023.01);
(Continued)

(58) Field of Classification Search
CPC ......... G10L 15/07; G10L 15/20; G10L 15/22; G10L 15/26; G10L 15/30; G10L 15/02;
(Continued)

(56) References Cited

U.S. PATENT DOCUMENTS 6,594,630 B1    7/2003  Zlokarnik
6,985,865 B1    1/2006  Packingham
(Continued)

FOREIGN PATENT DOCUMENTS

AU       667871 B2    4/1996
CA      2231504 C     8/2005
(Continued)

OTHER PUBLICATIONS

Bornemark, et al., "Gaze-supported Interaction with Smart Objects through an Augmented Reality User Interface," Malmo University Electronic Publishing, May 30, 2017, pp. 1-41.
(Continued)

Primary Examiner — Vu B Hang
(74) Attorney, Agent, or Firm — Erik Swanson; Andrew M. Calderon; Calderon Safran & Wright P.C.

(57) ABSTRACT

The exemplary embodiments disclose a method, a computer program product, and a computer system for managing user commands. The exemplary embodiments may include a user giving one or more commands to one or more devices, collecting data of the one or more commands, extracting one or more features from the collected data, and determining which one or more of the commands should be executed on which one or more of the devices based on the extracted one or more features and one or more models.

18 Claims, 7 Drawing Sheets

(51) Int. Cl.
*G06F 18/214* (2023.01)
*G10L 15/22* (2006.01)
*G10L 15/30* (2013.01)
*H04L 12/28* (2006.01)
*G10L 15/02* (2006.01)
*G10L 15/16* (2006.01)
*G10L 25/30* (2013.01)

(52) U.S. Cl.
CPC ............ *G10L 15/30* (2013.01); *H04L 12/282* (2013.01); *H04L 12/2829* (2013.01); *G10L 15/02* (2013.01); *G10L 15/16* (2013.01); *G10L 2015/223* (2013.01); *G10L 2015/225* (2013.01); *G10L 25/30* (2013.01)

(58) Field of Classification Search
CPC ....... G10L 25/78; G10L 25/87; G10L 15/063; G10L 15/08; G10L 15/16; G10L 19/005; G10L 19/00; G10L 25/27; G10L 25/30; G10L 15/12
See application file for complete search history.

(56) References Cited

U.S. PATENT DOCUMENTS

| | | | |
|---|---|---|---|
| 8,099,289 B2 | 1/2012 | Mozer | |
| 9,697,828 B1 | 7/2017 | Prasad et al. | |
| 9,791,921 B2 | 10/2017 | Poulos et al. | |
| 9,854,032 B2 | 12/2017 | Liu et al. | |
| 9,940,936 B2 | 4/2018 | Sejnoha | |
| 10,317,992 B2 | 6/2019 | Prokofieva et al. | |
| 10,360,926 B2 * | 7/2019 | Mortensen | G10L 15/02 |
| 10,664,512 B1 | 5/2020 | He et al. | |
| 11,348,581 B2 | 5/2022 | Choudhary et al. | |
| 11,450,314 B2 | 9/2022 | Ni et al. | |
| 11,996,095 B2 * | 5/2024 | Rodriguez Bravo | G06V 20/20 |
| 2018/0046851 A1 | 2/2018 | Kienzle et al. | |
| 2018/0322870 A1 | 11/2018 | Lee | |
| 2019/0215879 A1 | 7/2019 | Song et al. | |
| 2019/0384389 A1 | 12/2019 | Kim | |
| 2020/0221223 A1 | 7/2020 | Zhou | |
| 2021/0158803 A1 | 5/2021 | Knudson et al. | |

FOREIGN PATENT DOCUMENTS

| | | |
|---|---|---|
| JP | 2006195637 A | 7/2006 |
| KR | 20190094319 A | 8/2019 |
| WO | 2001061875 A1 | 8/2001 |

OTHER PUBLICATIONS

Disclosed Anonymously, "Augmented Reality Interface for Visualizing and Interacting with IoT Devices," IP.Com Prior Art Database Technical Disclosure, IP.Com No. IPCOM000255233D, https://priorart.ip.com/IPCOM/000255233, Sep. 11, 2018, pp. 1-22.

Disclosed Anonymously, "Method and System for Enabling Augmented Reality-Based Learning for Smart Home Management," IP.Com Prior Art Database Technical Disclosure, IP.Com No. IPCOM000260922D, https://ip.com/IPCOM/000260922, Jan. 8, 2020, pp. 1-4.

Disclosed Anonymously, "Visual selection of IOT devices using AR glasses and eye tracking," IP.Com Prior Art Database Technical Disclosure, IP.Com No. IPCOM000247200D, https://priorart.ip.com/IPCOM/000247200, Aug. 16, 2016, pp. 1-2.

Mell et al., "The NIST Definition of Cloud Computing", National Institute of Standards and Technology, Special Publication 800-145, Sep. 2011, pp. 1-7.

List of KYNDRYL Patents or Patent Applications Treated as Related, dated Apr. 17, 2024, 2 pages.

* cited by examiner

AUGMENTED REALITY ENABLED COMMAND MANAGEMENT

BACKGROUND

The exemplary embodiments relate generally to augmented reality, and more particularly to using augmented reality to manage multiple user commands.

Many people interact with multiple smart devices at once. Many people may wish to verbally communicate commands to multiple smart devices in quick succession. For example, upon arriving home carrying groceries in their hands, an individual may wish to verbally command their smart heater to heat their house to a specific temperature, verbally command their smart lights to turn on, and verbally command their smart television to turn on in quick succession.

SUMMARY

The exemplary embodiments disclose a method, a computer program product, and a computer system for managing user commands. The exemplary embodiments may include a user giving one or more commands to one or more devices, collecting data of the one or more commands, extracting one or more features from the collected data, and determining which one or more of the commands should be executed on which one or more of the devices based on the extracted one or more features and one or more models.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
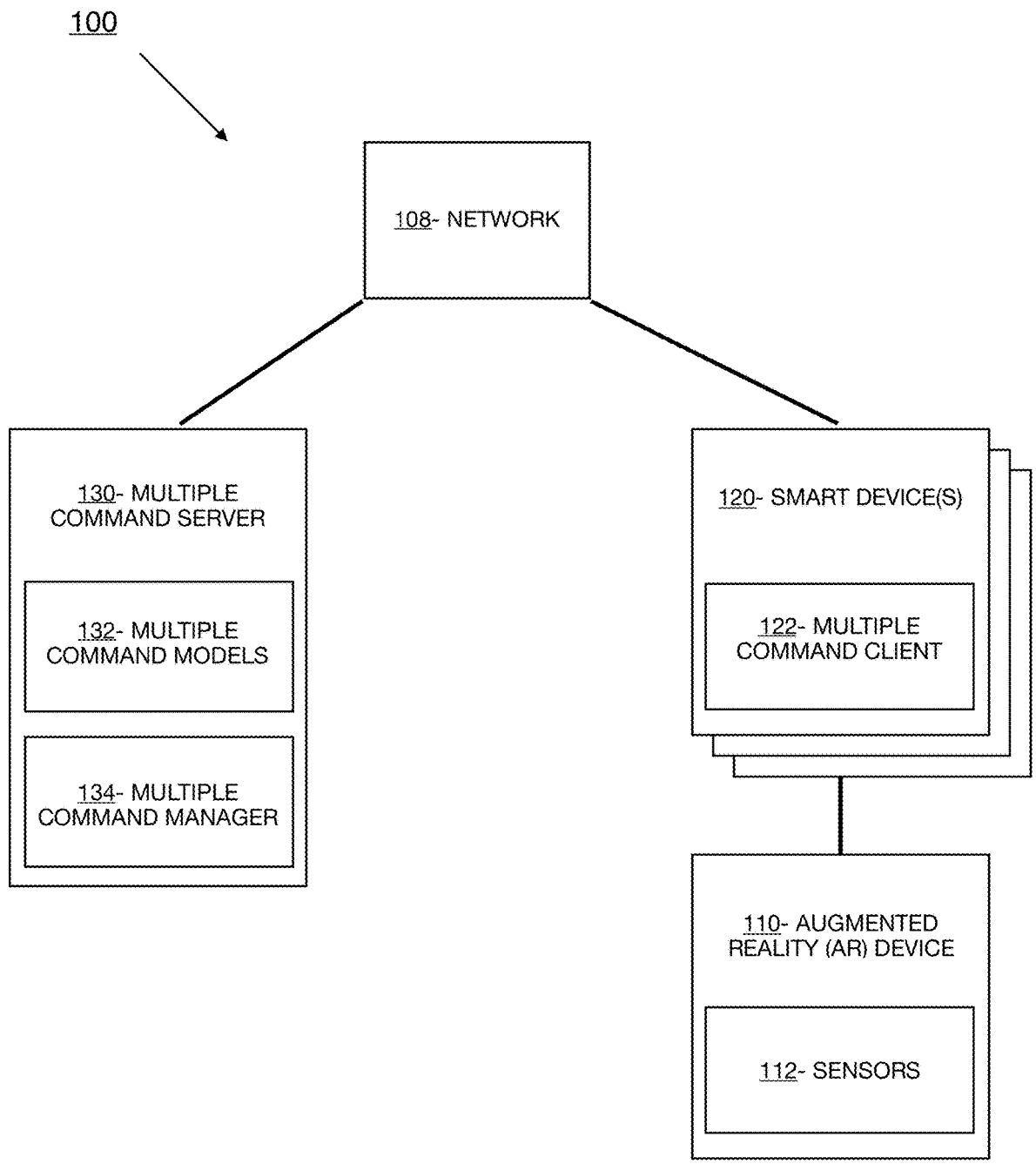
FIG. 1 depicts an exemplary schematic diagram of a multiple command management system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Many people interact with multiple smart devices at once. Many people may wish to verbally communicate commands to multiple smart devices in quick succession. For example, upon arriving home carrying groceries in their hands, an individual may wish to verbally command their smart heater to heat their house to a specific temperature, verbally command their smart lights to turn on, and verbally command their smart television to turn on in quick succession.

Exemplary embodiments are directed to a method, computer program product, and computer system for managing user commands. In embodiments, machine learning may be used to create models capable of determining which one or more smart devices 120 a user's commands are directed towards, while feedback loops may improve upon such models. Moreover, data from user uploads, databases, or the sensors 112 may be used to manage multiple user commands. In embodiments, a command may refer to any user input such as a statement or question, and may be conveyed via audio, text, touch, gesture, eye movement, etc. A user may wish to communicate with multiple smart devices 120 in quick succession in a number of circumstances. For example, upon arriving home carrying groceries in their hands, a user may wish to verbally command their smart heater to heat their house to a specific temperature, verbally command their smart lights to turn on, and verbally command their smart television to turn on all in quick succession. In another example, a user may be listening to loud music on their smart speakers and receive an incoming call from their smartphone. The user may not have enough time to walk over to the smart speaker, mute the smart speaker, walk over to their smartphone, and answer the incoming call before the call goes to voicemail. The user may instead wish to quickly say, "Mute smart speakers. Answer incoming phone call on speakerphone." In general, it will be appreciated that embodiments described herein may relate to aiding in the managing of user commands within any environment and for any motivation.

FIG. 1 depicts the multiple command management system 100, in accordance with the exemplary embodiments. According to the exemplary embodiments, the multiple command management system 100 may include one or more augmented reality (AR) devices 110, one or more smart devices 120, and a multiple command server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the multiple command management system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the exemplary embodiments, the AR device 110 may be a wearable device capable of overlaying/superimposing computer-generated images upon a user's view of a real-world scene. In embodiments, the AR device 110 may include one or more sensors 112, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the AR device 110 is shown as a single device, in other embodiments, the AR device 110 may be comprised of a cluster or plurality of computing devices, in a modular manner, etc., working together or working independently. The AR device 110 is described in greater detail as a hardware implementation with reference to FIG. 5, as part of a cloud implementation with reference to FIG. 6, and/or as utilizing functional abstraction layers for processing with reference to FIG. 7.

In example embodiments, the sensors 112 may comprise a camera, microphone, light sensor, infrared sensor, movement detection sensor, pressure detection sensor, speedometer, accelerometer, gyroscope, global positioning system (GPS) sensor, or other sensory hardware equipment. Moreover, the AR device 110 may incorporate an array of the one or more sensors 112 such that information can be obtained by the sensors 112 in multiple directions, at different times/intervals, in different mediums/frequencies, and the like. For example, the AR device 110 may be a pair of goggles that includes three forward-facing cameras that each record an adjacent sixty-degree viewing angle spanning a total of one-hundred and eighty degrees in front of a user. Moreover, data processing techniques may be implemented such that directional information of visual and audio data can be obtained based on signals received by each of the three sensors 112, such as trilateration and triangulation.

While the sensors 112 are depicted as integrated with the AR device 110, in embodiments, the sensors 112 may be incorporated within an environment in which the multiple command management system 100 is implemented. For example, the sensors 112 may be one or more microphones built into an auditorium, a camera built into a facility, speedometer, accelerometer, spectrometer, pedometer, etc. Moreover, data processing techniques may be implemented such that directional information of visual and audio data can be obtained based on signals received by each of the sensors 112, such as trilateration and triangulation. In other embodiments, the sensors 112 may be integrated with other smart devices, e.g., smart phones and laptops, within an environment implementing the multiple command management system 100. In such embodiments, the sensors 112 may communicate directly with other networks and devices, such as the network 108. The sensors 112 are described in greater detail as a hardware implementation with reference to FIG. 5, as part of a cloud implementation with reference to FIG. 6, and/or as utilizing functional abstraction layers for processing with reference to FIG. 7.

In the example embodiment, the smart device(s) 120 include a multiple command client 122, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While each smart device 120 is shown as a single device, in other embodiments, each smart device 120 may be comprised of a cluster or plurality of computing devices, in a modular manner, etc., working together or working independently. The smart device 120 is described in greater detail as a hardware implementation with reference to FIG. 5, as part of a cloud implementation with reference to FIG. 6, and/or as utilizing functional abstraction layers for processing with reference to FIG. 7.

The multiple command client 122 may act as a client in a client-server relationship. The multiple command client 122 may also be a software and/or hardware application capable of communicating with and providing a user interface for a user to interact with a server, for example the multiple command server 130, via the network 108. Moreover, in the example embodiment, the multiple command client 122 may be capable of transferring data from the AR device 110 and/or the sensors 112 between one or more smart devices 120 and other devices via the network 108. In embodiments, the multiple command client 122 utilizes various wired and wireless connection protocols for data transmission and exchange, including Bluetooth, 2.4 gHz and 5 gHz internet, near-field communication, Z-Wave, Zigbee, etc. The multiple command client 122 is described in greater detail with respect to FIG. 2.

In the exemplary embodiments, the multiple command server 130 may include one or more multiple command models 132 and a multiple command manager 134, and may act as a server in a client-server relationship with the multiple command client 122. The multiple command server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the multiple command server 130 is shown as a single device, in other embodiments, the multiple command server 130 may be comprised of a cluster or plurality of computing devices, working together or working independently. The multiple command server 130 is described in greater detail as a hardware implementation with reference to FIG. 5, as part of a cloud implementation with reference to FIG. 6, and/or as utilizing functional abstraction layers for processing with reference to FIG. 7.

The multiple command models 132 may be one or more algorithms modelling a correlation between one or more features detected by the sensors 112 and one or more smart devices 120 that a user's commands are directed towards. In the example embodiment, the multiple command models 132 may be generated using machine learning methods, such as neural networks, deep learning, hierarchical learning, Gaussian Mixture modelling, Hidden Markov modelling, and K-Means, K-Medoids, or Fuzzy C-Means learning, etc., and may model a likelihood of the one or more features being indicative of which one or more smart devices 120 that a user's commands are directed towards. In embodiments, such features may relate to user speech and include trigger words, device names, command executability, etc. Such features may additionally relate to user gestures and include pointing, waving, eye direction, etc. The multiple command models 132 may weight the features based on an effect that the features have on determining which one or more smart devices 120 that a user's commands are directed towards.

In the exemplary embodiments, the multiple command manager 134 may be a software and/or hardware program capable of collecting training data, extracting features from the training data, and training one or more models based on the extracted features. The multiple command manager 134 may additionally be capable of configuring a session and detecting the grouping of two or more smart devices 120 by a user. The multiple command manager 134 may be further configured for detecting one or more commands of the user, collecting data of the one or more commands, extracting features from the collected data, and applying one or more models to the extracted features to determine which one or more smart devices 120 a user's commands are directed towards. Moreover, the multiple command manager 134 may be further configured for executing the user's one or more commands on the determined one or more smart devices 120. The multiple command manager 134 is additionally capable of evaluating whether the user's one or more commands were executed on the appropriate one or more smart devices 120, and adjusting the one or more models. The multiple command manager 134 is described in greater detail with reference to FIG. 2.

Figure 2:
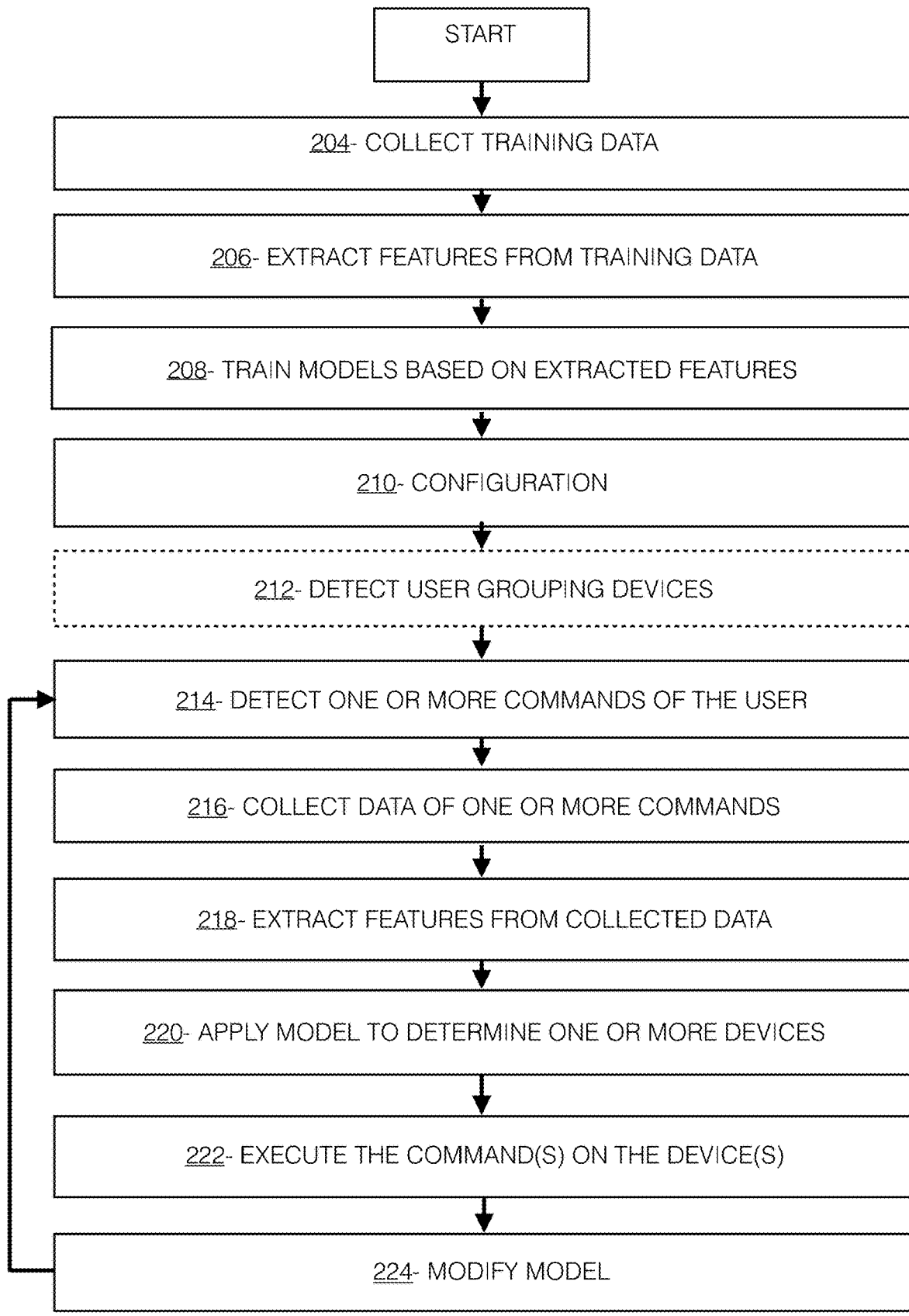
FIG. 2 depicts an exemplary flowchart illustrating the operations of a multiple command manager 134 of the multiple command management system 100 in managing multiple commands, in accordance with the exemplary embodiments.

FIG. 2 depicts an exemplary flowchart illustrating the operations of a multiple command manager 134 of the multiple command management system 100 in managing multiple commands, in accordance with the exemplary embodiments. In exemplary embodiments, the multiple command manager 134 first implements a training phase in which it trains the multiple command models 132 using labelled training data from previous user interactions with smart devices 120. The multiple command manager 134 then moves on to an operational phase in which it applies the trained multiple command models 132 to one or more current user commands in order to determine which one or more smart devices 120 a user's commands are directed towards.

The multiple command manager 134 may collect and/or receive training data (step 204). In embodiments, the training data may be sourced from one or more previous user interactions with smart devices 120. Training data may include data of a user's one or more commands labelled with the one or more smart devices 120 the user's commands were directed towards. For example, training data may include a user's commands, "Air Conditioner set cool to 68 degrees. Ceiling fan turn on. Television turn on" labelled with smart devices: air conditioner, ceiling fan, and television. In embodiments, collected training data may be labelled such that smart devices 120 are correlated with user commands to be executed on those smart devices 120. For example, training data may include audio data of a user's commands, "Turn on. Turn off. Set to 300 degrees," and video data of the user's first pointing towards a smart speaker, then gesturing towards a light, and finally looking at an oven. The user command and gesture data may be labelled with "smart speaker: turn on, light: turn off, oven: set to 300 degrees." In embodiments, the multiple command manager 134 may collect training data of a user manually executing a command on a smart device 120. For example, if the multiple command manager 134 collects data of the user saying, "Turn on, turn on, turn on" while pointing at a smart speaker, and walking over to the smart speaker and manually turning the smart speaker on, the multiple command manager 134 may label the collected data of the user's speech and pointing with "smart speaker: turn on." The multiple command manager 134 may collect training data from microphones and video cameras built into the user's AR device 110. The multiple command manager 134 may retrieve training data via user upload, databases, or the sensors 112. In embodiments, the multiple command manager 134 may collect training data via the sensors 112 as one or more microphones built into an auditorium, a camera built into a facility, etc. The collected training data may be related to user speech and include trigger words, device names, command executability, etc., and/or additionally may be related to user gestures and include pointing, waving, eye direction, etc.

To further illustrate the operations of the multiple command manager 134, reference is now made to an illustrative example where the multiple command manager 134 collects labelled training data of previous user interactions with smart devices 120. For each user interaction, the multiple command manager 134 collects data of a user's commands labelled with the smart devices 120 the user's commands are directed towards and the corresponding commands that the user wishes to be executed on those smart devices 120.

The multiple command manager 134 may extract one or more features from the collected and/or received training data (step 206). The extracted features may be extracted from the audio, video, etc. data and/or databases, and may include features related to user speech such as trigger words, device names, command executability, etc. The extracted features may additionally include features relating to user gestures such as pointing, waving, eye direction, manual operation of the smart devices, etc. In embodiments, the multiple command manager 134 may use techniques such as feature extraction, natural language processing, named entity recognition, optical character recognition, image processing, audio processing, pattern/template matching, data comparison, convolutional neural networks, Mel frequency cepstral coefficient based extraction, etc. to identify user speech features such as trigger words, device names, command executability, etc. For example, if audio data of a user saying, "Television turn on. Speakers turn on" is collected as training data, the multiple command manager 134 may extract device names television and speakers. In embodiments, the multiple command manager 134 may extract trigger words specific to certain smart devices 120. For example, if a user says, "Alexa, turn off. Hey Siri, call John" the multiple command manager 134 may extract "Alexa" and "Hey Siri" as trigger words. In another example, if a user says, "Heat to 300 degrees," the multiple command manager 134 may extract devices oven and stove for command executability. If a user says, "Play Beatles music," the multiple command manager 134 may extract devices smart speakers and smart phone for command executability. In embodiments, command executability may be determined by detecting one or more units of measurement in a user's command, for example degrees Fahrenheit, degrees Celsius, decibels, etc. The multiple command manager 134 may later associate extracted trigger words, device names, and command executability with the one or more labelled smart devices 120 of the training data when training one or more models.

In addition to extracting user speech features such as device names, trigger words, command executability, etc., the multiple command manager 134 may also extract features relating to user gestures such as pointing, waving, eye direction, manual use of the smart devices 120, etc. from the collected training data (step 206 continued). In embodiments, the multiple command manager 134 may use techniques such as feature extraction, image processing, pattern/template matching, data comparison, convolutional neural networks, etc. to identify gestures such as pointing, waving, eye direction/movement, etc. For example, if video is collected of a user pointing and looking at a first smart device 120 and subsequently waving their arm to point at a second smart device 120, the multiple command manager 134 may extract the pointing, eye direction, and waving of the user. The multiple command manager 134 may further extract manual use of the smart devices 120. For example, if the multiple command manager 134 collects data of the user saying, "Turn on, turn on, turn on" while pointing at a smart speaker, and walking over to the smart speaker and manually turning the smart speaker on, the multiple command manager 134 may extract the user's manual use of the smart speaker. The multiple command manager 134 may later associate extracted gestures with the one or more labelled smart devices 120 of the training data when training one or more models.

With reference to the previously introduced example where the multiple command manager 134 collects data of labelled user interactions with one or more smart devices 120, the multiple command manager 134 extracts speech features such as trigger words, device names, and command executability, as well as gesture features such as pointing, waving, and eye direction from the collected training data with respect to each previously received user interaction.

The multiple command manager 134 may train one or more multiple command models 132 based on the extracted features (step 208). The multiple command manager 134 may train one or more multiple command models 132 based on an association of the one or more extracted features with the one or more labelled smart devices 120 and commands of the user to be executed on those smart devices 120. As previously mentioned, such extracted features may include speech features such as trigger words, device names, etc. as well as gesture features such as pointing, waving, eye direction, etc. and the one or more multiple command models 132 may be generated through machine learning techniques such as neural networks. Moreover, the multiple command manager 134 may train the one or more multiple command models 132 to weight the features such that features shown to have a greater correlation with determining which smart devices 120 and corresponding executions a user's commands are directed towards are weighted greater than those features that are not. In embodiments, the multiple command models 132 may include a model for each user. In other embodiments, the multiple command manager 134 may simply train one multiple command model 132 to be later applied to all users. Based on the multiple command models 132's extracted features and weights associated with such extracted features, the multiple command manager 134 may later determine which of the one or more smart devices 120 a user's commands are directed towards as well as what execution the user is commanding.

With reference to the previously introduced example where the multiple command manager 134 extracts speech features such as trigger words, device names, and command executability as well as gesture features such as pointing, waving, and eye direction from the collected training data, the multiple command manager 134 trains a model for each user of the collected training data.

The multiple command manager 134 may receive a configuration (step 210). Having trained the one or more multiple command models 132, the multiple command manager 134 may now apply the one or more multiple command models 132 to one or more user commands in real time. The multiple command manager 134 may first, however, receive a user configuration by receiving a user registration and user preferences. The user registration may be uploaded by a user, i.e., a person wearing the AR device 110 of the multiple command management system 100, and the configuration may be received by the multiple command manager 134 via the multiple command client 122 and the network 108. Receiving the user registration may involve referencing a user profile via user login credentials, internet protocol (IP) address, media access control (MAC) address, etc., or receiving user input information such as a name, date of birth, gender, address/geographic information, phone number, email address, company name, device serial numbers, one or more smart device 120 types, AR device 110 type, sensors 112 types, one or more smart devices 120 capable of executing user commands, and the like. Receiving a user registration may also involve receiving or extracting data from databases such as data of user smart devices 120. Lastly, the multiple command manager 134 may receive a configuration of the one or more sensors 112, whether they be fixed to one or more devices (e.g., the one or more smart devices 120 or the AR device 110) or fixed within an environment in which the multiple command management system 100 is implemented.

During configuration, the multiple command manager 134 may further receive user preferences (step 210 continued). User preferences may include preferences for the manner in which the multiple command manager 134 should execute the one or more user commands on one or more smart devices 120. For example, user preferences may specify notifying the user and/or waiting for feedback or confirmation from the user before executing the user's commands on one or more smart devices 120. For example, a user may upload user preferences for confirmation of which commands will be executed on which smart devices 120 via video feedback.

Figure 3:
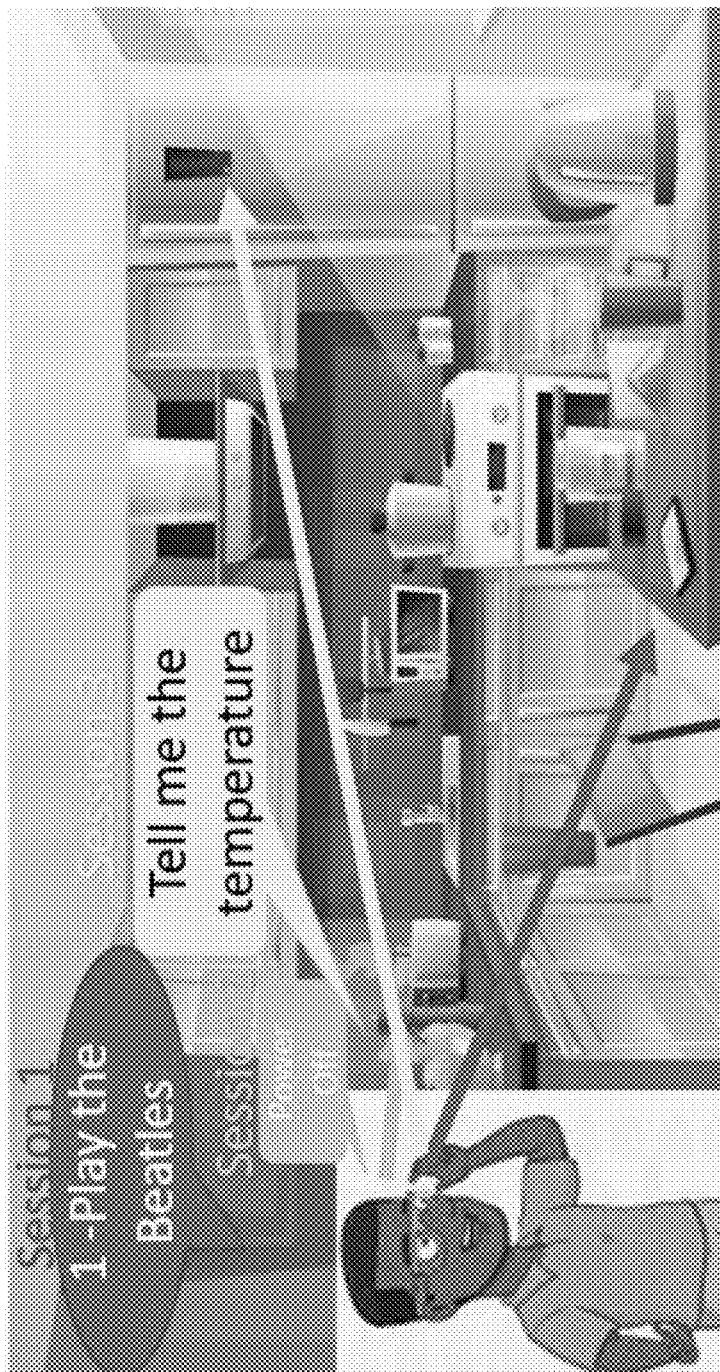
FIG. 3 depicts an exemplary schematic diagram depicting a user giving multiple commands to the multiple command management system 100, wherein each command is with reference to a separate session, and each session consists of one smart device 120, in accordance with the exemplary embodiments.

With reference to the previously introduced example where the multiple command manager 134 trains a model for each user of the collected training data, and additionally with reference to FIG. 3, the multiple command manager 134 receives a user registration via user upload including the user's name, type of smart device 120, type of AR device 110, type of sensors 112 including a microphone and video camera located on the AR device 110, and types of smart devices 120 capable of executing user commands including a smartphone, smart fridge, and a smart toaster. The multiple command manager 134 also receives user preferences via user upload specifying that confirmation of which commands are to be executed on which smart devices 120 is to be communicated to the user via video feedback on the user's AR device 110.

The multiple command manager 134 may optionally detect the user grouping two or more smart devices 120 (optional step 212). In embodiments, the user may group two or more smart devices 120 based on ownership, type of device, type of commands to be received, authorization, location, usage, IP address, category/domain, etc. In embodiments, the multiple command manager 134 may detect the user grouping two or more smart devices 120 via integration of the multiple command client 122 with the operating system of one or more smart device 120, for example an operating system of a laptop or smartphone. For example, the user may input on their smart device 120 that a television and speaker are to be grouped as session "entertainment devices." For example, and with reference to FIG. 4, the user groups their air conditioner, lights, and their sliding window blinds as "session 1," and their smart television and closed-circuit television (CCTV) as "session 2." In embodiments, the user may group two or more smart devices 120 or separate a group of devices via finger, hand, or arm gesture, audio command, etc. at any time. In embodiments, the user may not group two or more smart devices 120, and the multiple command manager 134 may treat each smart device 120 as its own group or session. In embodiments, the user may share a configuration of one or more sessions or groups of one or more devices with other individuals.

With reference to the previously introduced example where the multiple command manager 134 receives a user registration and user preferences, and additionally with reference to FIG. 3, the multiple command manager 134 does not detect the user grouping smart devices 120, so the multiple command manager 134 treats the smartphone as session 1, the smart toaster as session 2, and the smart fridge as session 3. Alternatively, and not shown by FIG. 3, the multiple command manager 134 may identify groupings based on category, for example grouping heating, air condition, fans, and blinds based on being categorized as HVAC.

The multiple command manager 134 may detect one or more commands of the user (step 214). In embodiments, the multiple command manager 134 may detect one or more commands by way of a trigger, and may be triggered via a toggle switch, button, slider, etc. that may be selected by the user manually using a button/touchscreen/etc., by voice (trigger word, trigger phrase), by eye movement, and the like. For example, the multiple command manager 134 may detect a user command by detecting the user tapping their AR device 110 twice, looking to the top right of their field of vision, saying "command," etc. In embodiments, the multiple command manager 134 may utilize natural language processing to continuously monitor for one or more commands of the user.

With reference to the previously introduced example where the multiple command manager 134 treats the smartphone as session 1, the smart toaster as session 2, and the smart fridge as session 3, and additionally with reference to FIG. 3, the multiple command manager 134 detects the user giving three commands: "Play the Beatles," "Power Off," and "Tell me the Temperature."

Upon detecting one or more commands of the user, the multiple command manager 134 may collect data of the one or more commands (step 216). In embodiments, the multiple command manager 134 may begin collecting data when receiving a trigger from the user. As previously discussed, the multiple command manager 134 may be triggered via a toggle switch, button, slider, etc. that may be selected by the user manually by hand using a button/touchscreen/etc., by voice (trigger word, trigger phrase), by eye movement, etc. Alternatively, the multiple command manager 134 may continuously collect data of a user in anticipation of one or more commands. Anticipation may be based on user movement, for example detected by one or more sensors 112. Anticipation may be based on the user entering a geofence or connecting to network 108. The multiple command manager 134 may retrieve data of one or more user commands via the sensors 112, which may include one or more microphones built into an auditorium, a camera built into a facility, etc. The collected data may be related to user speech and include trigger words, device names, command executability, etc. The collected data may additionally relate to user gestures and include pointing, waving, eye direction, etc.

With reference to the previously introduced example where the multiple command manager 134 detects the user giving three commands: "Play the Beatles," "Power Off," and "Tell me the Temperature," the multiple command manager 134 collects video data from video cameras and audio data from microphones of the user's gestures and voice while giving the three commands.

The multiple command manager 134 may extract one or more features from the collected and/or received data (step 218). The multiple command manager 134 may extract one or more features from the collected and/or received data in the same manner as described with reference to step 206, however here the features are extracted not from the training data, but rather from the data of the current commands and gestures.

With reference to the previously introduced example where the multiple command manager 134 collects video data from video cameras and audio data from microphones of the user's gestures and voice while giving the three commands, the multiple command manager 134 extracts the below features in Table 1 from the collected data.

TABLE 1

| Commands and Extracted Features | |
| --- | --- |
| "Play the Beatles" | Command executability: smartphone |
| | Pointing towards: smartphone, smart fridge |
| | Eye direction towards: smartphone, smart fridge |
| "Power Off" | Command executability: smartphone, smart toaster, smart fridge, smart oven |
| | Pointing towards: smart toaster |
| | Eye direction towards: smart toaster |
| "Tell me the Temperature" | Command executability: smartphone, smart fridge, smart oven |
| | Pointing towards: smart phone, smart fridge |
| | Eye direction towards: smart phone, smart fridge |

The multiple command manager 134 may apply one or more models to the extracted features to determine which one or more smart devices 120 a user's commands are directed towards (step 220). As previously mentioned, such extracted features may be related to user speech and include trigger words, device names, command executability, etc. The extracted features may additionally relate to user gestures and include pointing, waving, eye direction, etc., and the one or more multiple command models 132 may be generated through machine learning techniques such as neural networks. In embodiments, the one or more multiple command models 132 may be trained at initialization and/or through the use of a feedback loop to weight the features such that features shown to have a greater correlation with appropriately identifying smart devices 120 a user's commands are directed towards are weighted greater than those features that are not. Based on the extracted features and weights associated with such extracted features, the multiple command manager 134 may determine which smart devices 120 a user's commands are directed towards. In embodiments where the user groups two or more smart devices 120 together, for example in a single session as discussed with reference to optional step 212, the multiple command manager 134 may apply one or more multiple command models 132 to the extracted features to determine that a user's command should be applied to all smart devices 120 grouped together as a single session. For example, if a user has grouped their smart television and smart speaker system together in a single session and gives the command, "Power off," the multiple command manager 134 may apply one or more multiple command models 132 to determine that both the smart television and smart speaker system should execute the command, "Power off."

With reference to the previously introduced example where the multiple command manager 134 extracts features from the collected data, the multiple command manager 134 applies a model to determine the smart devices 120 that should execute the user's commands below in Table 2.

TABLE 2

| Command to Device and Action Mapping | |
| --- | --- |
| "Play the Beatles" | Execute on smartphone |
| "Power Off" | Execute on smart toaster |
| "Tell me the Temperature" | Execute on smart fridge |

Upon the multiple command manager 134 determining which one or more devices a user's one or more commands are directed towards, the multiple command manager 134 may execute the one or more commands on the one or more smart devices 120 (step 222). In embodiments, the multiple command manager 134 may execute the one or more commands on the one or more smart devices 120 via integration of the multiple command client 122 with the operating systems of the one or more smart devices 120. For example, if the user gives the command, "Speaker volume up," the multiple command manager 134 may increase the speaker volume by one unit. In some embodiments, the multiple command manager 134 may notify the user of one or more commands and/or the devices executing those commands as confirmation. The multiple command manager 134 may confirm the commands and devices with the user by audio, video, text, or any other manner via the AR device 110 and/or the smartphone. The multiple command manager 134 may display one or more commands and corresponding devices executing those commands via overlay within a display of the AR device 110, and the one or more smart devices 120 executing the commands may be identified via text, color, boxing, highlighting, flashing, symbols, etc. For example, the multiple command manager 134 may overlay command, "Speaker volume up" in red, overlay command, "Television turn on" in green, overlay a red box around the user's smart speaker, and overlay a green box around the user's smart television. In addition, the commands and/or smart devices 120 executing the commands may be conveyed audially via one or more integrated speakers. As discussed with reference to configuration, the multiple command manager 134 may notify the user of one or more commands and/or one or more devices executing those commands according to the user preferences of configuration. In embodiments, the multiple command manager 134 may be configured for receiving user input acknowledging, dismissing, and/or affirming that the one or more commands and corresponding smart devices 120 are suitable and/or that one or more commands should be executed on the corresponding one or more smart devices 120.

With reference to the previously introduced example where the multiple command manager 134 applies a model to determine the smart devices 120 that should execute the user's commands, the multiple command manager 134 executes command, "Play the Beatles" on the user's smartphone, executes command, "Power Off" on the user's smart toaster, executes command, "Tell me the temperature" on the user's smart fridge, and notifies the user of the three devices executing the three commands with visual overlay on the user's AR device 110.

The multiple command manager 134 may evaluate and modify the multiple command models 132 (step 224). In the example embodiment, the multiple command manager 134 may verify whether the one or more commands were executed on the one or more appropriate smart devices 120 in order to provide a feedback loop for modifying the multiple command models 132. In embodiments, the feedback loop may simply provide a means for the user to indicate whether the one or more commands correspond to the appropriate one or more smart devices 120 and/or should be executed on the one or more smart devices 120. The feedback loop indication may be triggered via a toggle switch, button, slider, etc. that may be selected by the user manually by hand using a button/touchscreen/etc., by voice, by eye movement, and the like. Based on the multiple command manager 134 appropriately or inappropriately executing the one or more commands on one or more smart devices 120, the multiple command manager 134 may modify the multiple command models 132. In other embodiments, the multiple command manager 134 may infer or deduce whether the commands were executed appropriately. For example, the multiple command manager 134 may interpret user dialogue via natural language processing to determine whether the commands were executed appropriately. For example, if the user says, "That's not what I wanted" or other expressions indicative of a user's dissatisfaction, the multiple command manager 134 may infer that the one or more commands were executed on inappropriate smart devices 120 and modify the multiple command models 132 accordingly. In another example, if the user repeats their command multiple times, "Turn on, turn on, turn on" while pointing at a smart speaker, and then manually turns the smart speaker on, the multiple command manager 134 may determine that the user's command was not executed appropriately. Based on feedback received in the above or any other manners, the multiple command manager 134 may then modify the multiple command models 132 to more accurately execute commands on one or more smart devices 120.

With reference to the previously introduced example where the multiple command manager 134 executes command, "Play the Beatles" on the user's smartphone, executes command, "Power Off" on the user's smart toaster, executes command, "Tell me the temperature" on the user's smart fridge, and notifies the user of the three devices executing the three commands with visual overlay on the user's AR device 110, the user says, "Thank you" and the multiple command manager 134 modifies the multiple command models 132 accordingly.

FIG. 3 depicts an exemplary schematic diagram depicting a user giving multiple commands to the multiple command management system 100, wherein each command is with reference to a separate session, and each session consists of one smart device 120, in accordance with the exemplary embodiments.

Figure 4:
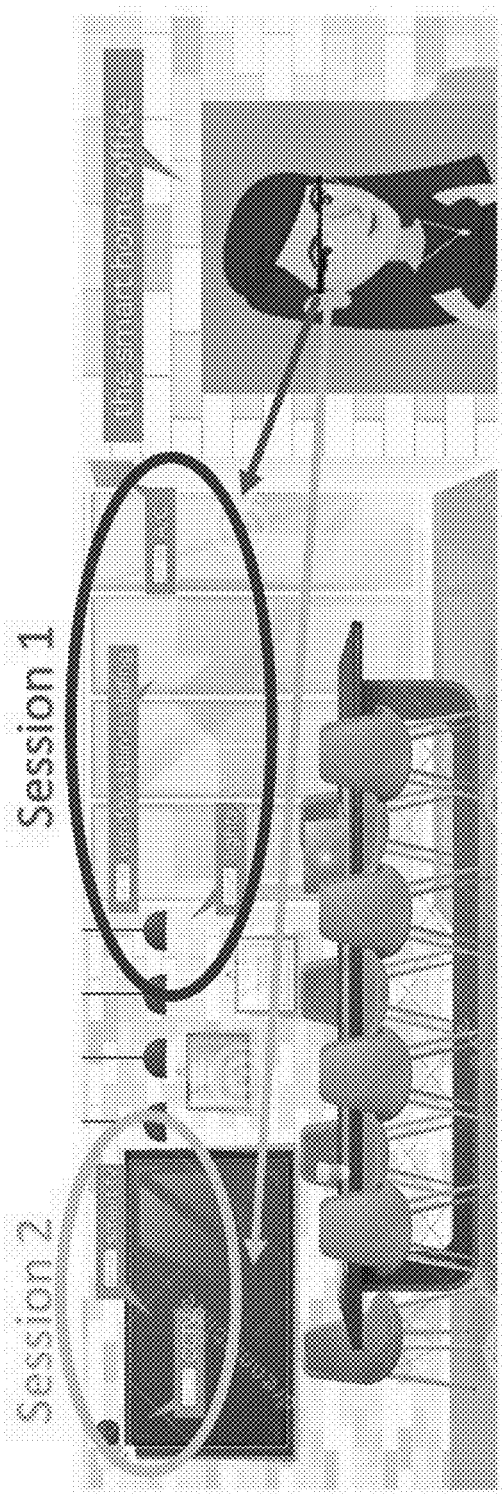
FIG. 4 depicts an exemplary schematic diagram depicting a user separating their smart office into two sessions, wherein each session consists of more than one smart device 120.

FIG. 4 depicts an exemplary schematic diagram depicting a user separating their smart office into two sessions, wherein each session consists of more than one smart device 120.

Figure 5:
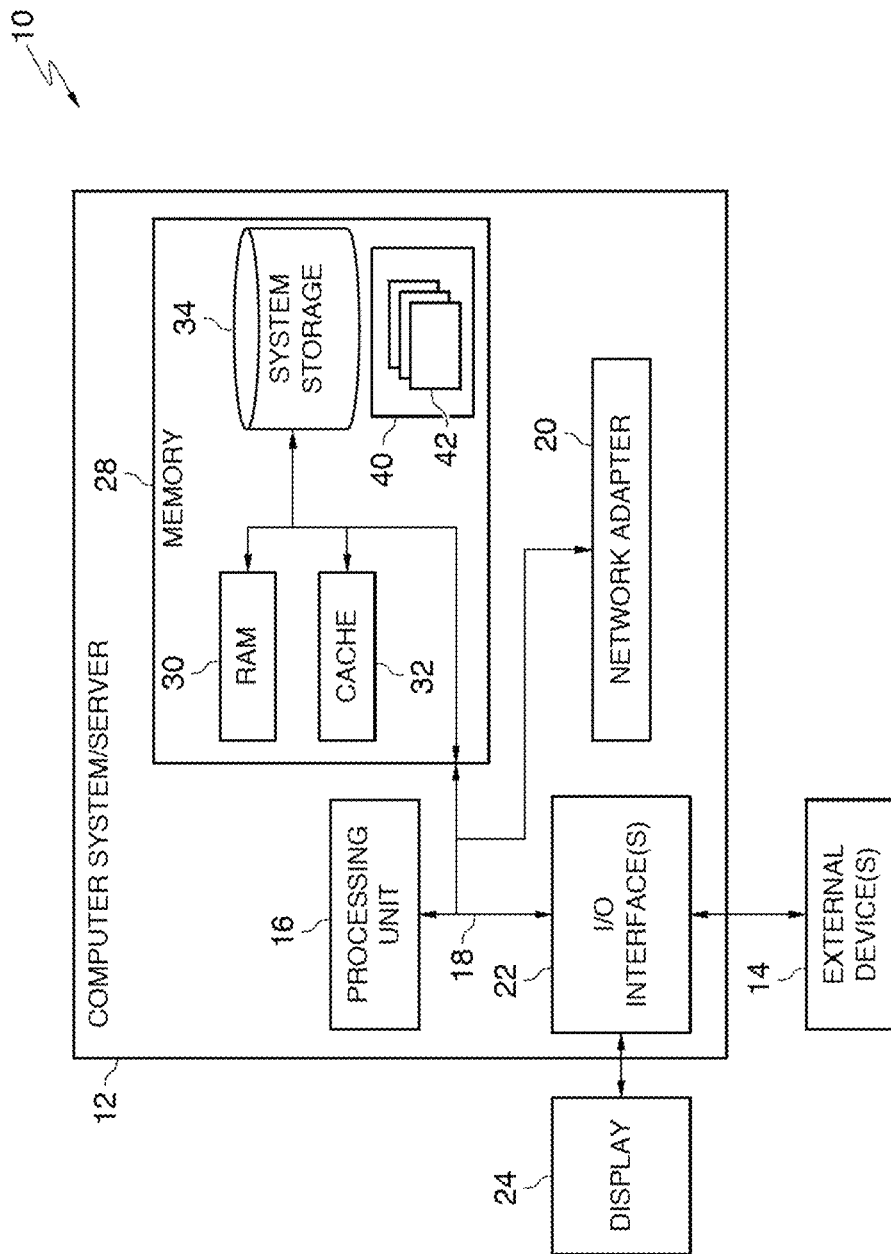
FIG. 5 depicts an exemplary block diagram depicting the hardware components of the multiple command management system 100 of FIG. 1, in accordance with the exemplary embodiments.

FIG. 5 depicts a block diagram of devices within the multiple command management system 100 of FIG. 1, in accordance with the exemplary embodiments. It should be appreciated that FIG. 5 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
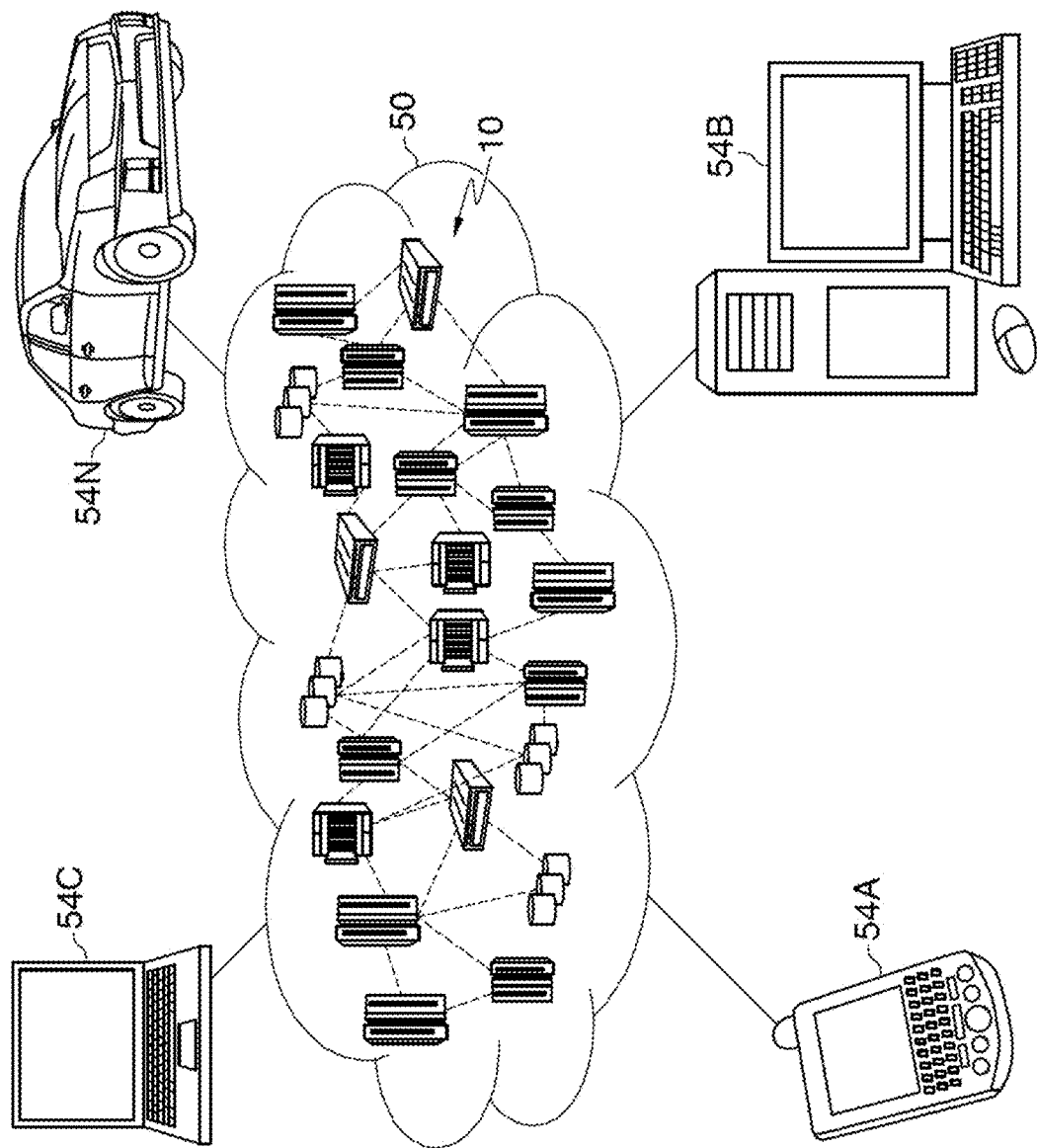
FIG. 6 depicts a cloud computing environment, in accordance with the exemplary embodiments.

Referring now to FIG. 6, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 40 and cloud computing environment 50 can communicate with any type of computerized device over any type of network and/or network addressable connection (e.g., using a web browser).

Figure 7:
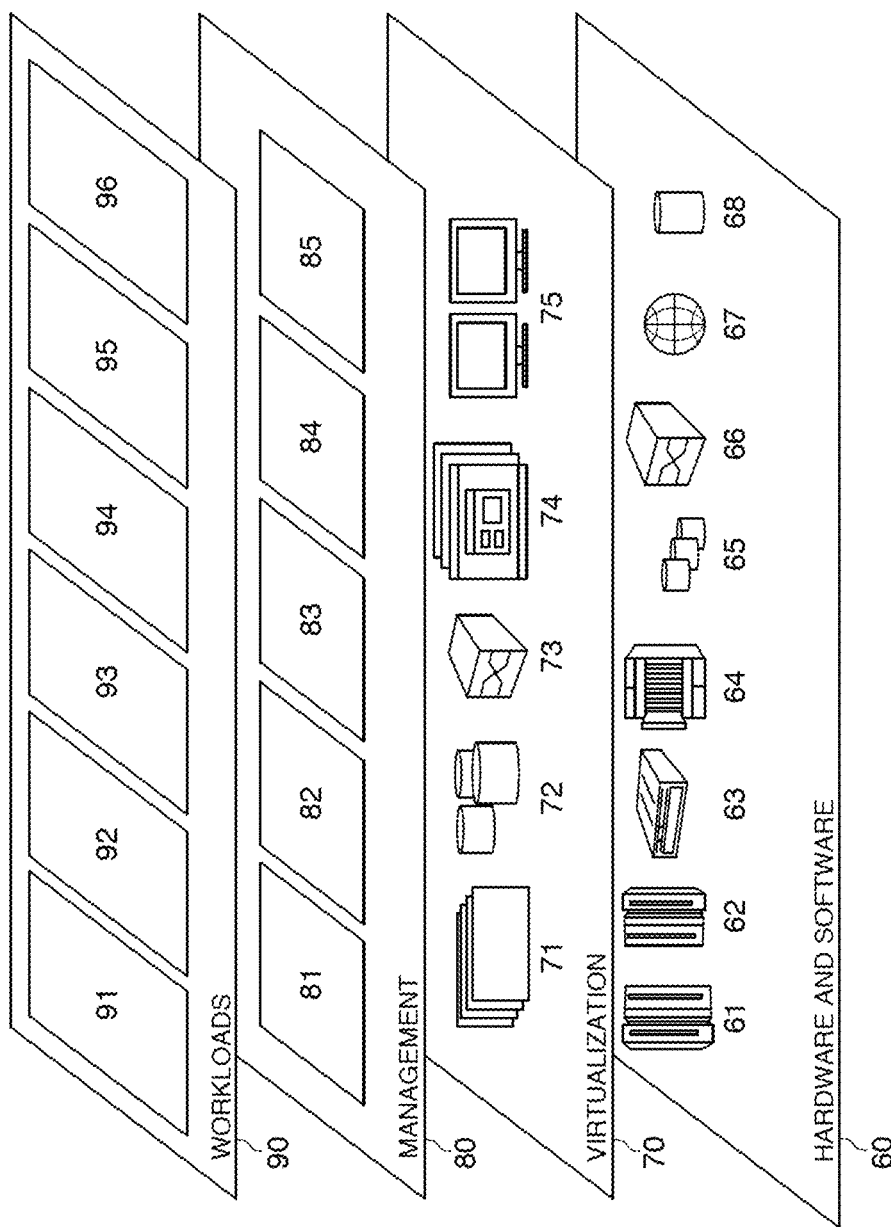
FIG. 7 depicts abstraction model layers, in accordance with the exemplary embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multiple command management 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for managing user commands, the method comprising:
   detecting a plurality of commands by way of a trigger;
   collecting data of the commands given in succession by a user to interact with one or more devices of plural smart devices in response to detecting the plurality of commands;
   extracting one or more features of the one or more devices of the plural smart devices from the collected data;
   determining which of the commands should be executed on which one or more of the devices of the plural smart devices, based on the extracted one or more features, wherein the extracted one or more features are weighted to have a greater correlation with the determined one or more of the devices which correspond to the commands than a correlation between remaining features and the determined one or more of the devices which correspond to the commands;
   and executing the commands on the one or more of the devices.

2. The method of claim 1, further comprising:
   notifying the user of which of the commands should be executed on which one or more of the devices.

3. The method of claim 1, further comprising:
   receiving feedback indicative of whether the determination of which commands should be executed on which one or more devices is appropriate; and
   adjusting one or more machine learning models based on the received feedback.

4. The method of claim 3, further comprising:
   collecting training data from user interactions with respective ones of the plural smart devices;
   extracting training features from the training data; and
   training the one or more machine learning models based on the extracted training features.

5. The method of claim 1, further comprising:
   grouping two or more devices together, wherein the two or more grouped devices are user configured groups and the two or more grouped devices all execute any command that is directed towards any of the two or more devices.

6. The method of claim 1, wherein the one or more features include trigger words, device names, command executability, pointing, waving, and eye direction.

7. A computer program product for managing user commands, the computer program product comprising:
   one or more non-transitory computer-readable storage media and program instructions stored on the one or more non-transitory computer-readable storage media capable of performing a method, the method comprising:
   detecting a plurality of commands by way of a trigger;
   collecting data of the commands given in succession by a user to interact with one or more devices of plural smart devices, wherein the collected data comprises audio data and video data, the video data being received from at least one sensor on an augmented reality (AR) device worn by the user in response to detecting the plurality of commands;
   extracting one or more features of the one or more devices of the plural smart devices from the collected data;
   determining which of the commands should be executed on which one or more of the devices based on the extracted one or more features, wherein the extracted one or more features are weighted to have a greater correlation with the determined one or more of the devices which correspond to the commands than a correlation between remaining features and the determined one or more of the devices which correspond to the commands;
   and executing the commands on the one or more of the devices.

8. The computer program product of claim 7, wherein the one or more features comprise a speech feature, a first gesture feature indicating a direction the user is pointing, and a second gesture feature indicating an eye direction of the user.

9. The computer program product of claim 7, further comprising:
   notifying the user of which of the commands should be executed on which one or more of the devices, wherein the notifying comprises displaying information on an overlay of the AR device utilized to affirm the information, the information indicating which of the commands should be executed on which one or more of the devices.

10. The computer program product of claim 7, further comprising:
    correlating, utilizing one or more models, the one or more features with the likelihood of determining which one or more of the devices the commands are directed towards.

11. The computer program product of claim 10, further comprising:
    receiving feedback indicative of whether the determination of which commands should be executed on which one or more devices is appropriate; and
    adjusting the one or more models based on the received feedback.

12. The computer program product of claim 10, further comprising:
    collecting training data from user interactions with respective ones of the plural smart devices, wherein the training data is labelled training data that indicates the respective ones of the plural smart devices;
    extracting training features from the training data; and
    training the one or more models based on the extracted training features.

13. The computer program product of claim 7, further comprising:
    grouping two or more devices together, wherein the two or more grouped devices all execute any command that is directed towards any of the two or more devices.

14. A computer system for managing user commands, the computer system comprising:
    one or more computer processors, one or more computer-readable storage media, and program instructions stored on the one or more of the computer-readable storage media for execution by at least one of the one or more processors capable of performing a method, the method comprising:

detecting a plurality of commands by way of a trigger;

collecting data of the commands given in succession by a user to interact with one or more of plural smart devices in response to detecting the plurality of commands;

extracting features of one or more of the plural smart devices from the collected data, wherein the extracted features comprise a speech feature and a gesture feature;

determining, using the extracted features, which one or more of the plural smart devices each of the commands should be executed on, wherein the extracted features are weighted to have a greater correlation with the determined one or more of the plural smart devices which correspond to the commands than a correlation between remaining features and the determined one or more of the plural smart devices which correspond to the commands;

and executing the commands on the determined one of the plural smart devices.

15. The computer system of claim 14, further comprising:
notifying the user, via an augmented reality interface, which one of the plural smart devices one or more of the commands should be executed on.

16. The computer system of claim 14, further comprising:
correlating, utilizing one or more machine learning models, the extracted features with the likelihood of determining which one of the plural smart devices one or more of the commands is directed towards.

17. The computer system of claim 16, further comprising:
receiving feedback indicative of whether the determination of which one of the plural smart devices is appropriate; and
adjusting the one or more machine learning models based on the received feedback.

18. The computer system of claim 16, wherein the determining which one of the plural smart devices one or more of the commands should be executed on comprises applying the one or more machine learning models to the extracted features, comprising the speech feature and the gesture feature, to determine which one of the plural smart devices the user command is directed to.

* * * * *